US012603387B2

(12) United States Patent
Yeh et al.

(10) Patent No.: US 12,603,387 B2
(45) Date of Patent: Apr. 14, 2026

(54) SEPARATOR AND APPLICATION THEREOF

(71) Applicant: MICROCOSM TECHNOLOGY CO., LTD., Tainan City (TW)

(72) Inventors: Chun-Ting Yeh, Tainan City (TW); Chia Yun Wang, Tainan City (TW); Sih-Ci Jheng, Tainan City (TW)

(73) Assignee: MICROCOSM TECHNOLOGY CO., LTD., Tainan City (TW)

(*) Notice: Subject to any disclaimer, the term of this patent is extended or adjusted under 35 U.S.C. 154(b) by 685 days.

(21) Appl. No.: 18/152,964

(22) Filed: Jan. 11, 2023

(65) Prior Publication Data

US 2023/0231270 A1 Jul. 20, 2023

(30) Foreign Application Priority Data

Jan. 14, 2022 (TW) ................................. 111101647

(51) Int. Cl.
*H01M 50/414* (2021.01)
*H01M 50/434* (2021.01)
*H01M 50/446* (2021.01)

(52) U.S. Cl.
CPC ....... *H01M 50/414* (2021.01); *H01M 50/434* (2021.01); *H01M 50/446* (2021.01)

(58) Field of Classification Search
None
See application file for complete search history.

(56) References Cited

U.S. PATENT DOCUMENTS 6,998,193 B2 * 2/2006 Sun ........................ B01D 71/50
429/247

FOREIGN PATENT DOCUMENTS

JP 2011068872 A * 4/2011

OTHER PUBLICATIONS

Suzuki, K., Iizuka, Y., Tanaka, M., Kawakami, H.—Phosphoric acid-doped sulfonated polyimide and polybenzimidazole blend memebranes: high proton transport at wide temperatures under low humidity conditions due to new proton transport pathways, J. Mater. Chem., 2021, 22, pp. 23767-23772 (Year: 2021).*
Machine translation of JP2011-068872A, published on Apr. 7, 2011 (Year: 2011).*

* cited by examiner

*Primary Examiner* — Anca Eoff
(74) *Attorney, Agent, or Firm* — Cermak & McGowan LLP; Shelly Guest Cermak

(57) ABSTRACT

The present invention provides a separator formed by hydrolysis of a resin film. The resin film comprises a non-hydrolyzable organic polymer; and a hydrolyzable organic polymer being hydrolyzable by treatment with at least one of an acid aqueous solution, an alkaline aqueous solution and pure water, wherein the content of the hydrolyzable organic polymer ranges from 10 parts by weight to 70 parts by weight relative to 100 parts by weight of the resin film. The separator of the present invention has good ion conductivity and thus, is extremely suitable for use in various types of batteries.

13 Claims, 4 Drawing Sheets

SEPARATOR AND APPLICATION THEREOF

This application claims priority under 35 U.S.C. § 119 to Taiwanese Patent Application No. 111101647, filed Jan. 14, 2022, the entirety of which is incorporated by reference herein.

BACKGROUND OF THE INVENTION

Field of the Invention

The present invention relates to a separator and its application and, in particular, to an ion conductive separator and its application.

Description of the Prior Art

Common energy storage devices in the world include, for example, hydrogen fuel cells, all-vanadium flow batteries and lithium ion and other chemical energy storage. Whether the development of renewable energy is successful or not, energy storage system is one of the key factors. Because energy storage has a regulating effect, reserved load capacity, and instantaneous power supply capacity, it can slow down the impact of instantaneous changes in the power supply system on the power grid and thus becomes an indispensable and important part.

Various energy storage methods have their advantages and disadvantages, and the separator plays an important role in the battery. As the market's requirements for battery safety and performance increase, separators are required to have high ionic conductivity, prevent positive and negative electrons from passing through, prevent solid or liquid, or gas from passing through to cause leakage, resulting in reduced capacitance, and prevent safety issues such as rupture, liquid leakage, air leakage or burning.

SUMMARY OF THE INVENTION

In view of the above issues, an object of the present invention is to provide a separator with high ion conductivity.

To achieve the above object, the present invention provides a separator formed by hydrolysis of a resin film, wherein the resin film comprises:

a non-hydrolyzable organic polymer; and a hydrolyzable organic polymer being hydrolyzable with treatment of at least one of an aqueous acid solution, an aqueous alkaline solution and pure water, wherein a content of the hydrolyzable organic polymer ranges from 10 parts by weight to 70 parts by weight, based on 100 parts by weight of the resin film.

Preferably, the non-hydrolyzable organic polymer comprises polybenzimidazole, polybenzoxazole, polybenzothiazole, polyetherketone, polyphenylene ether, polyethersulfone, polysulfone, polyphenylene sulfide, polypropylene, polyethylene, polystyrene or a combination thereof. More preferably, the non-hydrolyzable organic polymer has a hydrophilic functional group in the side chain. Particularly preferably, the hydrophilic functional group comprises a sulfonic acid group, a phosphoric acid group, a carboxylic acid group, an amide group or a hydroxyl group.

Preferably, the hydrolyzable organic polymer includes a repeating unit represented by formula (1):

(1)

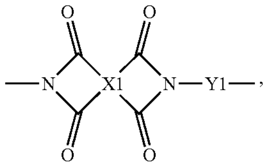

wherein X1 is a tetravalent group comprising at least one aromatic or alicyclic group; Y1 is a divalent group comprising at least one aromatic or alicyclic group, and at least one of X1 and Y1 comprises at least one functional group structure among an ester bond, an amide bond, a sulfonic acid group, a phosphoric acid group, a carboxylic acid group, a hydroxyl group and a nitro group.

More preferably, X1 is selected from the tetravalent groups represented by formula (2), formula (3), formula (4), formula (5), or formula (6):

(2)

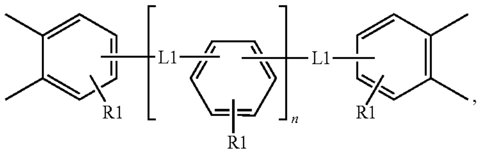

(3)

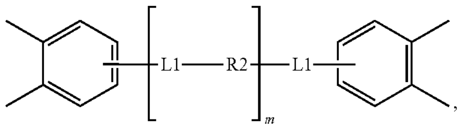

(4)

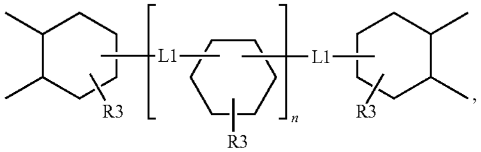

(5)

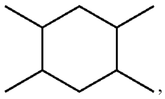

(6)

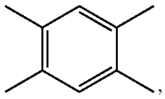

wherein R1 independently represents —H, —F, —$CF_3$, —$SO_3H$, —$PO_3H_2$, —COOH, —OH, a linear or branched chain alkyl with 1 to 6 carbon atoms or phenyl; R2 independently represents a linear or branched chain hydrocarbon group with 2 to 36 carbon atoms or a cyclic hydrocarbon group with 3 to 20 carbon atoms; R3 independently represents —H, —F, —$CF_3$, —$SO_3H$, —$PO_3H_2$, —COOH, —OH, a linear or branched chain hydrocarbon group with 1 to 6 carbon atoms; L1 independently represents —O—, —S—, —$SO_2$—, a single bond, —NH—, —C(═O)—, —CH═CH—, —C≡C—, —$CH_2$—, —$(CH_2)_2$—, —$C(CH_3)_2$—, —$C(CF_3)_2$—, —C(═O)O—, —OC(═O)—, —C(═O)NH— or —NH C(═O)—; n independently represents an integer from 0 to 5; and m represents an integer from 1 to 5.

More preferably, Y1 is the divalent group represented by formula (7), formula (8), or formula (9):

(7)

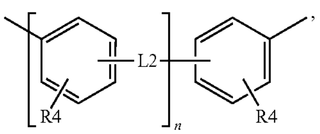

(8)

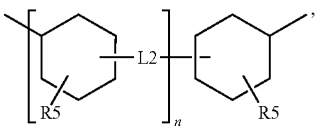

(9)

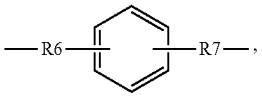

wherein L2 independently represents —O—, —S—, —$SO_2$—, a single bond, —NH—, —C(═O)—, —CH═CH—, —C≡C—, —$CH_2$—, —$(CH_2)_2$—, —$C(CH_3)_2$—, —$C(CF_3)_2$—, —C(═O)O—, —OC(═O)—, —C(═O)NH— or —NHC(═O)—; R4 independently represents —H, —F, —$CF_3$, —$SO_3H$, —$PO_3H_2$, —COOH, —OH, a linear or branched chain hydrocarbon group with 1 to 6 carbon atoms or phenyl; R5 independently represents —H, —F, —$CF_3$, —$SO_3H$, —$PO_3H_2$, —COOH, —OH, a linear or branched chain hydrocarbon group with 1 to 6 carbon atoms or phenyl; R6 and R7 independently represent a linear or branched chain hydrocarbon group with 1 to 9 carbon atoms; and n represents an integer from 0 to 5.

Preferably, the separator is improved by more than 10% in ionic conductivity after hydrolysis.

Preferably, the separator has an elongation at break of greater than 10%.

Preferably, the separator has a thickness of 0.1 μm to 100 μm.

Preferably, the resin film further comprises a filler, the content of which is greater than 0 part by weight and not more than 60 parts by weight, based on 100 parts by weight of the resin film. More preferably, the filler is selected from a flame retardant, a hydrophilic material composed of an acidic substance and an alkaline substance, a ceramic oxide, a lithium salt, an organic acid, an ionic liquid, or a combination thereof.

Preferably, the resin film is formed from a composition comprising the non-hydrolyzable organic polymer, the hydrolyzable organic polymer, and optionally an organic solvent.

The present invention also provides a combination film, which comprises the separator described above.

The present invention further provides a battery, which comprises:

an anode layer;

a cathode layer; and the separator described above and disposed between the anode layer and the cathode layer.

Preferably, the battery comprises a fuel cell, a flow battery, or a lithium battery.

The separator of the present invention has high ionic conductivity and low swelling through the design of the hydrolyzable polymer and dosage, and can effectively prevent vanadium ions in the electrolyte of the flow battery and the hydrogen in the fuel battery from passing through, thereby having low vanadium ion permeability and low hydrogen permeability, which helps to improve the safety of the batteries.

DETAILED DESCRIPTION OF THE EMBODIMENTS

Figure 1:
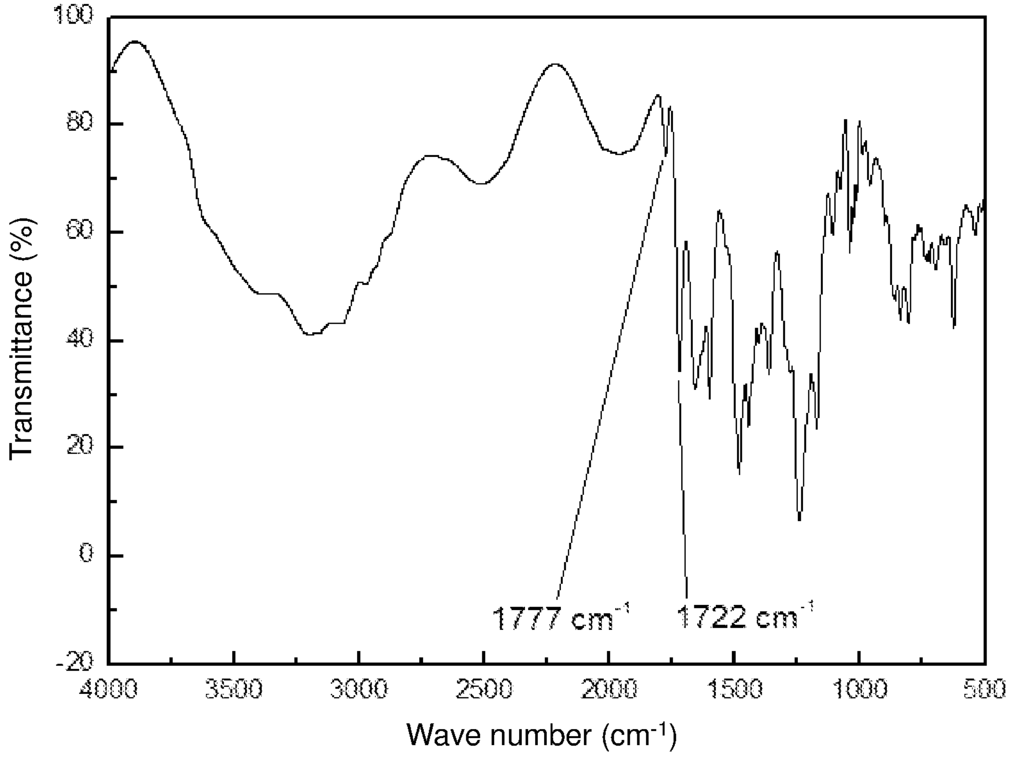
FIG. 1 shows the FTIR spectrum of the separator before hydrolysis according to Example 1 of the present invention.

The separator provided by the present invention is different from the conventional ones in that it has high ionic conductivity, low swelling, volume stability, high mechanical properties, low vanadium ion permeability, and low hydrogen permeability.

In the present invention, the separator is formed by hydrolyzing a resin film, and the resin film comprises: a non-hydrolyzable organic polymer; a hydrolyzable organic polymer being hydrolyzable with treatment of at least one (such as two or three) of an aqueous acid solution, an aqueous alkaline solution and pure water, wherein the content of the hydrolyzable organic polymer ranges from 10 parts by weight to 70 parts by weight (preferably 20 to 70 parts by weight, more preferably 30 to 70 parts by weight, and particularly preferably 40 to 70 parts by weight), based on 100 parts by weight of the resin film.

The non-hydrolyzable organic polymer has a non-hydrolyzable covalent bond, such as: an imidazole bond, an oxazole bond, a carbon-carbon bond, a sulfone bond, biphenyl, a fluorine group, a ketone group, an ether group, etc., so its structure will not be affected even though it is subject to hydrolysis. The non-hydrolyzable organic polymer includes, but is not limited to, polybenzimidazole (PBI), polybenzoxazole (PBO), polybenzothiazole (PBT), polyetherketone (PEEK), polyphenylene oxide (PPO), polyethersulfone (PES), polysulfone, polyphenylene sulfide (PPS), polypropylene (PP), polyethylene (PE) and polystyrene (PS). The non-hydrolyzable organic polymer can be used alone or in combination of two or more (e.g., three or four).

In the present invention, the non-hydrolyzable organic polymer preferably has a hydrophilic functional group in the side chain such that it will help the hydrolyzable polymer of the present invention to carry out the hydrolysis reaction. The hydrophilic functional group is preferably a sulfonic acid group, a phosphoric acid group, a carboxylic acid group, an amide group or a hydroxyl group.

In the present invention, the content of the non-hydrolyzable organic polymer may range from 30 parts by weight to 90 parts by weight (preferably 30 to 80 parts by weight, more preferably 30 to 70 parts by weight, and particularly preferably 30 to 60 parts by weight), based on 100 parts by weight of the resin film.

In the present invention, the hydrolyzable organic polymer preferably includes a repeating unit represented by formula (1):

(1)

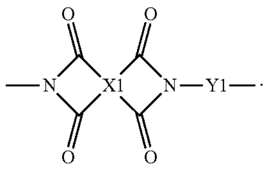

In formula (1), X1 is a tetravalent group comprising at least one aromatic or alicyclic group; Y1 is a divalent group comprising at least one aromatic or alicyclic group, and at least one of X1 and Y1 comprises at least one functional group structure among an ester bond, an amide bond, a sulfonic acid group, a phosphoric acid group, a carboxylic acid group, a hydroxyl group and a nitro group. For example, X1 comprises at least one functional group structure among an ester bond, an amide bond, a sulfonic acid group, a phosphoric acid group, a carboxylic acid group, a hydroxyl group and a nitro group, and Y1 does not comprise any functional group structure among an ester bond, an amide bond, a sulfonic acid group, a phosphoric acid group, a carboxylic acid group, a hydroxyl group and a nitro group. Alternatively, Y1 comprises at least one functional group structure among an ester bond, an amide bond, a sulfonic acid group, a phosphoric acid group, a carboxylic acid group, a hydroxyl group and a nitro group, and X1 does not comprise any functional group structure among an ester bond, an amide bond, a sulfonic acid group, a phosphoric acid group, a carboxylic acid group, a hydroxyl group and a nitro group. Alternatively, both X1 and Y1 comprise at least one functional group structure among an ester bond, an amide bond, a sulfonic acid group, a phosphoric acid group, a carboxylic acid group, a hydroxyl group and a nitro group. Besides, more specifically, the hydrolyzable organic polymer may include at least one (such as: at least two, at least three, at least four, at least five) repeating unit represented by formula (1).

In the present invention, at least one of X1 and Y1 comprises at least one (such as two or three) functional group structures among an ester bond, an amide bond, a sulfonic acid group, a phosphoric acid group, a carboxylic acid group, a hydroxyl group and a nitro group. For example, at least one of X1 and Y1 comprises both an ester bond and a hydroxyl group, at least one of X1 and Y1 comprises both an ester bond and a sulfonic acid group, at least one of X1 and Y1 comprises both an ester bond and a phosphoric acid group, or at least one of X1 and Y1 comprises both an ester bond and a carboxylic acid group.

X1 may be a tetravalent group derived from dianhydride monomers. X1 may be the same or different each time it appears. X1 may be selected from the tetravalent groups represented by formula (2), formula (3), formula (4), formula (5), or formula (6):

(2)

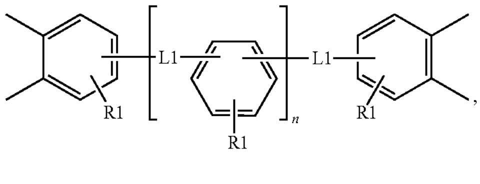

-continued (3)

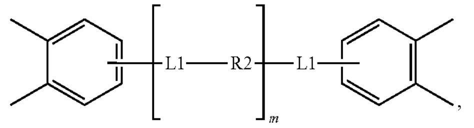

(4)

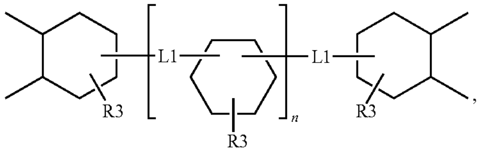

(5)

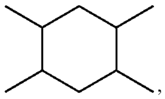

(6)

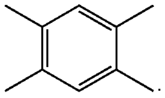

In formula (2) to formula (4), R1 may be the same or different each time it appears, and may independently represent —H, —F, $-CF_3$, $-SO_3H$, $-PO_3H_2$, —COOH, —OH, a linear or branched chain alkyl with 1 to 6 carbon atoms or phenyl. R2 may be the same or different each time it appears, and may independently represent a linear or branched chain hydrocarbon group with 2 to 36 carbon atoms or a cyclic hydrocarbon group with 3 to 20 carbon atoms. R3 may be the same or different each time it appears, and may independently represent —H, —F, $-CF_3$, $-SO_3H$, $-PO_3H_2$, —COOH, —OH, or a linear or branched chain hydrocarbon group with 1 to 6 carbon atoms. L1 may be the same or different each time it appears, and may independently represent —O—, —S—, $-SO_2-$, a single bond, —NH—, —C(═O)—, —CH═CH—, —C≡C—, $-CH_2-$, $-(CH_2)_2-$, $-C(CH_3)_2-$, $-C(CF_3)_2-$, —C(═O)O—, —OC(═O)—, —C(═O)NH— or —NHC(═O)—. "n" may be the same or different each time it appears, and may independently represent any integer from 0 to 5, such as 1, 2, 3 or 4. "m" represents any integer from 1 to 5, such as 1, 2, 3 or 4.

The following illustrates several examples of X1.

For example: when n is 0, X1 may be the tetravalent group as shown below:

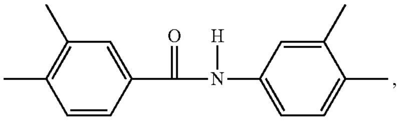

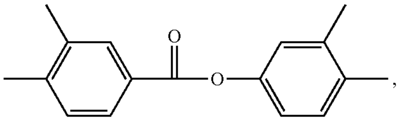

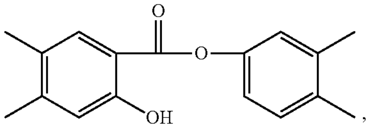

-continued
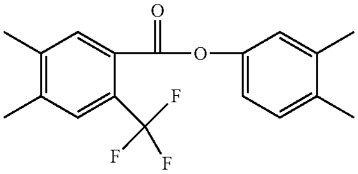,
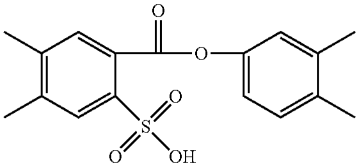,
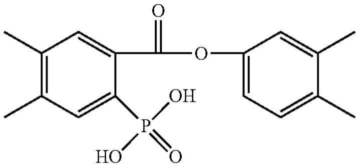,
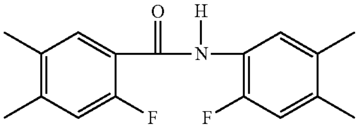,
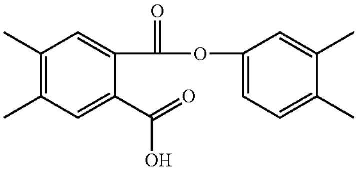,
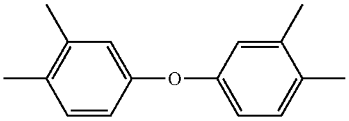,
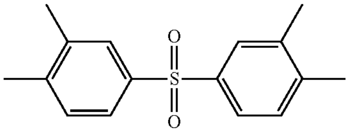,
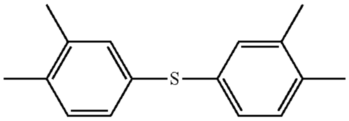,
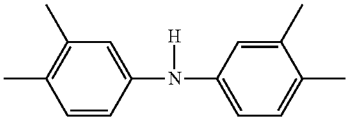,
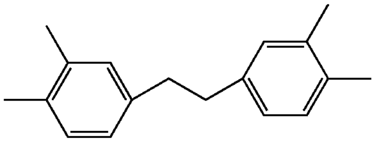,
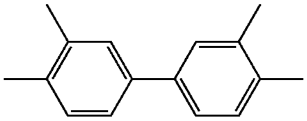
( L1 being a single bone) ,
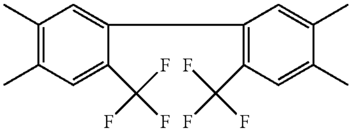
(L1 being a single bone)
,
-continued
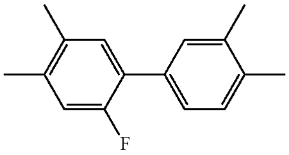
(L1 being a single bone) ,
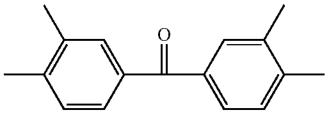,
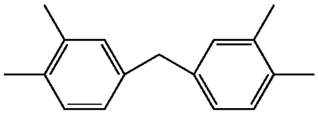,
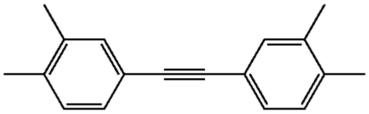,
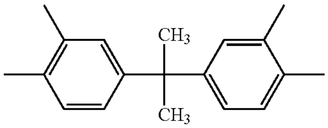,
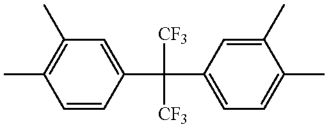,
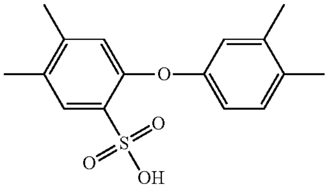,
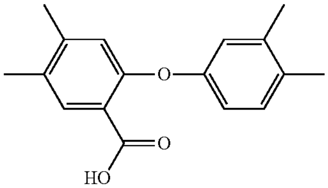,
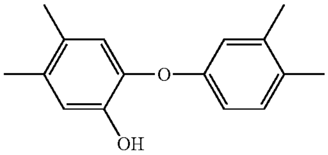,
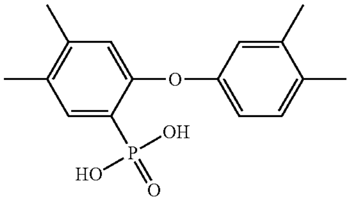,
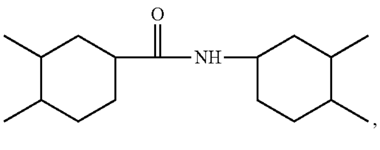, -continued

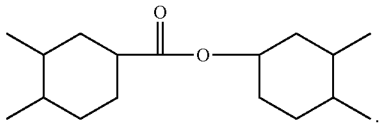.

X1 can also be the tetravalent group exemplified below:

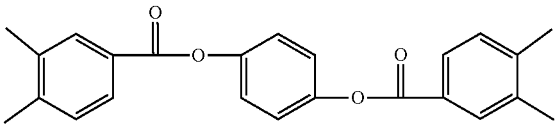,

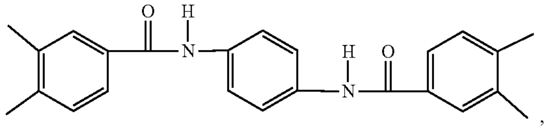,

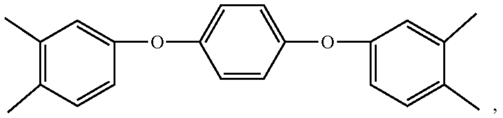,

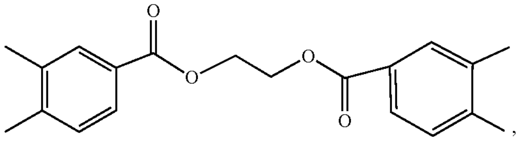,

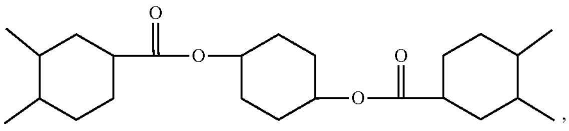,

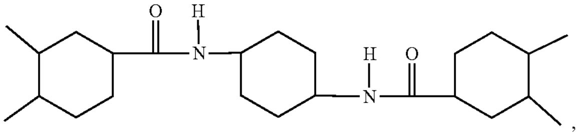,

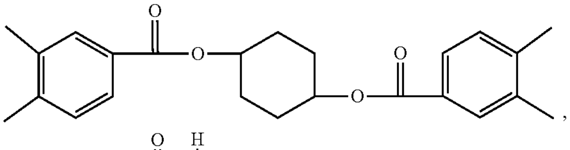,

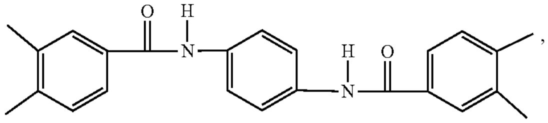,

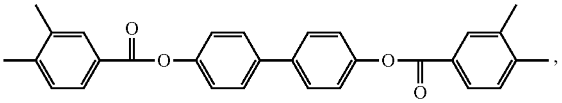,

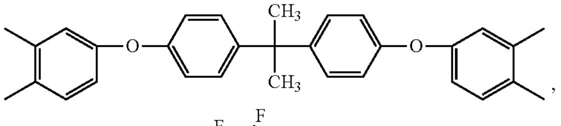,

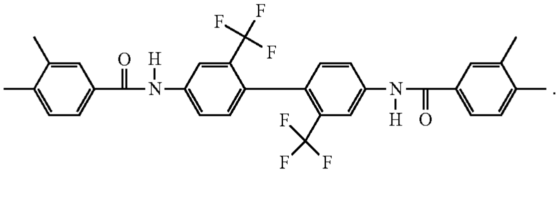.

The hydrolyzable organic polymer may have one or two or more (such as three, four, five) tetravalent groups as described above.

In formula (1), Y1 is the divalent group represented by formula (7), formula (8), or formula (9):

(7)

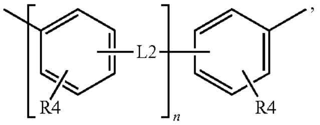, (8)

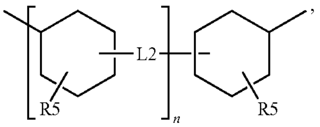, (9)

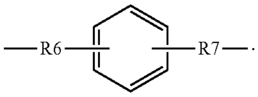.

L2 may be the same or different each time it appears, and may independently represents —O—, —S—, —$SO_2$—, a single bond, —NH—, —C(=O)—, —CH=CH—, —C≡C—, —$CH_2$—, —$(CH_2)_2$—, —$C(CH_3)_2$—, —$C(CF_3)_2$—, —C(=O)O—, —OC(=O)—, —C(=O)NH— or —NHC(=O)—; R4 may be the same or different each time it appears, and may independently represents —H, —F, —$CF_3$, —$SO_3H$, —$PO_3H_2$, —COOH, —OH, a linear or branched chain hydrocarbon group with 1 to 6 carbon atoms or phenyl; R5 may be the same or different each time it appears, and may independently represents —H, —F, —$CF_3$, —$SO_3H$, —$PO_3H_2$, —COOH, —OH, a linear or branched chain hydrocarbon group with 1 to 6 carbon atoms or phenyl; R6 may be the same or different each time it appears, and may independently represent a linear or branched chain hydrocarbon group with 1 to 9 carbon atoms; R7 may be the same or different each time it appears, and may independently represent a linear or branched chain hydrocarbon group with 1 to 9 carbon atoms; and n represents any integer from 0 to 5, such as 1, 2, 3 or 4.

The following illustrates several examples of Y1.

For example: when n is 0, Y1 may be the divalent group as shown below:

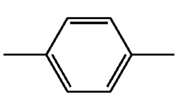,

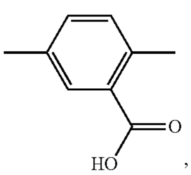,

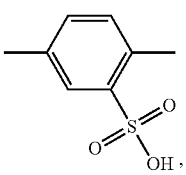,

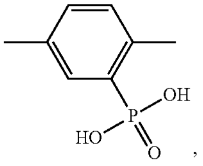,

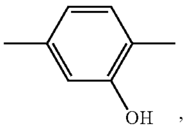,

-continued
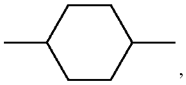 ,
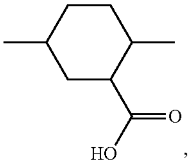 ,
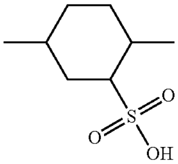 ,
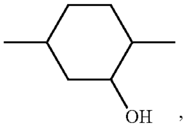 ,
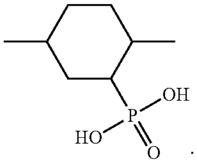 .
For example: when n is 1, Y1 may be the divalent group as shown below:
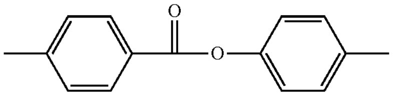 ,
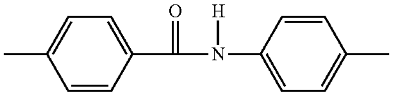 ,
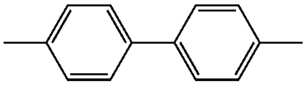 (L2 being a single bond) ,
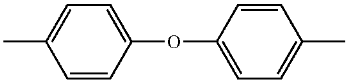 ,
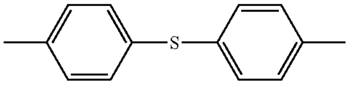 ,
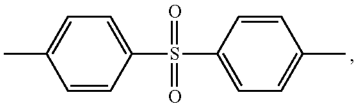 ,
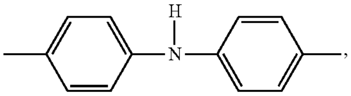 ,
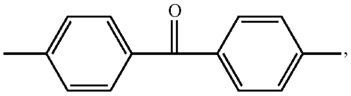 ,
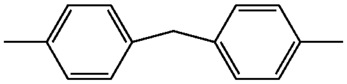 ,
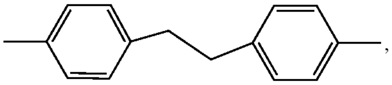 ,
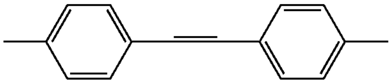 ,
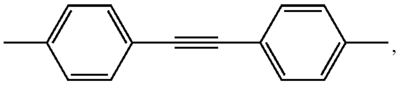 ,
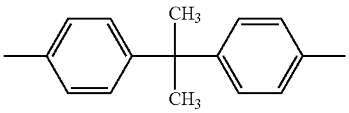 ,
-continued
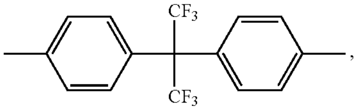 ,
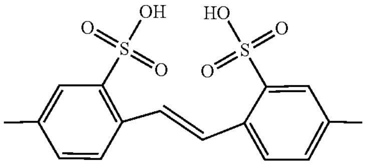 ,
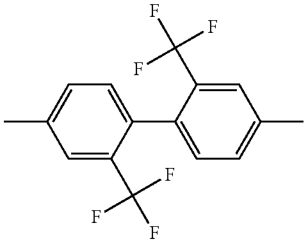 (L2 being a single bond) ,
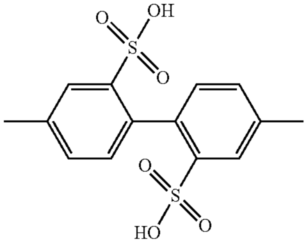 (L2 being a single bond) ,
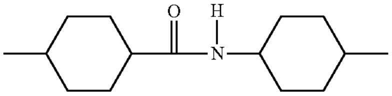 ,
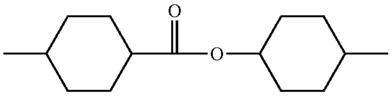 ,
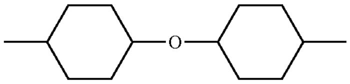 ,
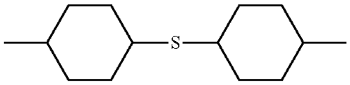 ,
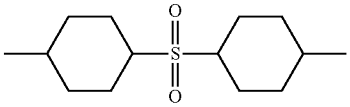 ,
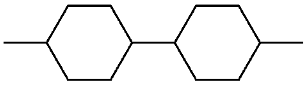 (L2 being a single bond) ,
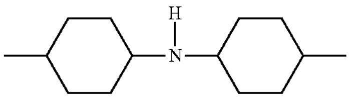 ,
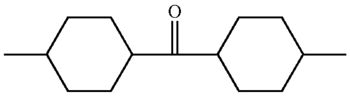 ,
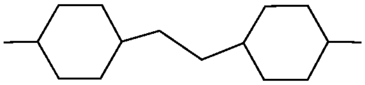 ,
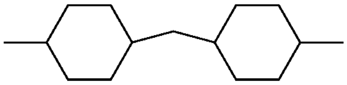 , -continued

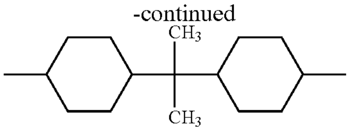
,

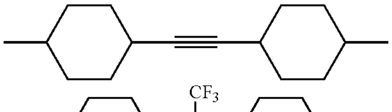
,

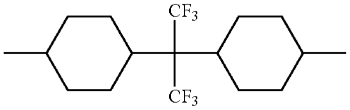
.

Y1 can also be the divalent group exemplified below:

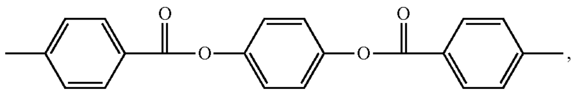
,

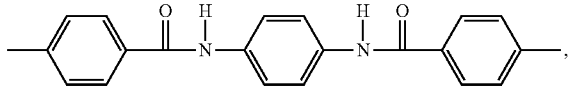
,

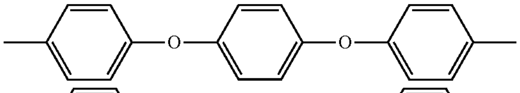
,

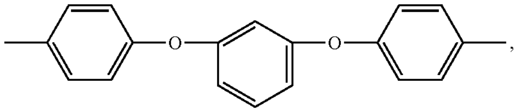
,

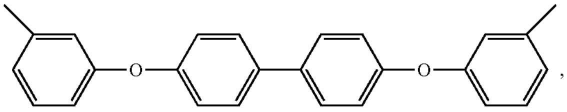
,

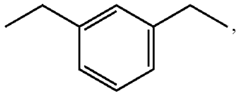
,

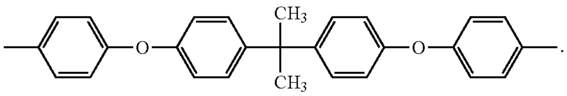
.

The hydrolyzable organic polymer may have one or two or more (such as three, four, five) divalent groups as described above.

In the present invention, the hydrolyzable organic polymer is preferably hydrolyzable whenever it is subject to hydrolysis in the aqueous acid solution, aqueous alkaline solution or pure water. In the present invention, the hydrolyzable organic polymer is preferably hydrolyzable in all three of the following conditions: in the aqueous acid solution, aqueous alkaline solution, and pure water.

Considering the ionic conductivity, the hydrolyzable polymer preferably has an imide bond in its structure. Compared with the amide bond generating one carboxylic acid group and one hydroxyl group or the ester bond generating one carboxylic acid group and one hydroxyl group after hydrolysis, the imide bond that generates two carboxylic acid groups and one amine group generates more hydrophilic functional group than the amide bond and the ester bond, so it has better ionic conductivity.

In some embodiments of the present invention, the equilibrium swelling ratio of the separator after being soaked in water, acid solution, or alkaline solution is less than 1.1.

In the present invention, the resin film may be formed from a composition, which comprises the non-hydrolyzable organic polymer, the hydrolyzable organic polymer, and optionally an organic solvent. Preferably, the organic solvent is included in the preparation process of the resin film. The resin film (separator precursor) may be formed by coating the composition and then heat-treating it to remove the organic solvent. In some embodiments, in the composition, the content of the hydrolyzable organic polymer is 10 to 70 parts by weight, based on 400 parts by weight of the organic solvent. In some embodiments, in the composition, the content of the non-hydrolyzable organic polymer is 30 to 90 parts by weight, based on 400 parts by weight of the organic solvent. In some embodiments, the content of the hydrolyzable organic polymer is 10 to 70 parts by weight, based on 500 parts by weight of the composition. In some embodiments, the content of the non-hydrolyzable organic polymer is 30 to 90 parts by weight, based on 500 parts by weight of the composition.

The preparation method of the separator precursor of the present invention may comprise the following steps: mixing the non-hydrolyzable organic polymer, the hydrolyzable organic polymer, and the organic solvent to obtain a mixture (composition); forming a coating film of the mixture on a substrate; and applying heat treatment to the coating film.

The preparation method of the separator of the present invention may comprise the following steps: mixing the non-hydrolyzable organic polymer, the hydrolyzable organic polymer, and the organic solvent to obtain a mixture (composition); forming a coating film of the mixture on a substrate; applying heat treatment to the coating film; and performing hydrolysis on the heat-treated coating film. In the present invention, the hydrolysis can be performed in an aqueous acid solution, an aqueous alkaline solution or pure water. In some embodiments, the hydrolysis is first performed with an aqueous alkaline solution and then performed with an aqueous acid solution. In some embodiments, the hydrolysis is first performed with an aqueous acid solution and then performed with an aqueous alkaline solution.

The conditions (such as temperature and time) of the mixing treatment are adjusted according to the types of the non-hydrolyzable organic polymer, the hydrolyzable organic polymer, and the organic solvent. In some embodiments of the present invention, the temperature range of the mixing treatment ranges from 60° C. to 100° C., and the time ranges from 2 hours to 4 hours. The organic solvent can be used alone or in combination of various types (such as two types, three types or four types). The organic solvent comprises N-methylpyrrolidone, 2-pyrrolidone, N,N-dimethylformamide, N,N-dimethylacetamide, γ-butyrolactone, dichlorobenzene, dioxane, toluene, xylene, chloroform, acetone, butanone, ethanol, methanol, but is not limited thereto. Based on the total amount of the organic solvent as 100 parts by weight, the total amount of the non-hydrolyzable organic polymer and the hydrolyzable organic polymer preferably ranges from 2 to 55 parts by weight.

The coating film may be formed by the blade coating method, spin coating method, or spray coating method. In some embodiments of the present invention, the coating film is formed by coating the mixture on a substrate. The purpose of the heat treatment is to remove the organic solvent and to densify the separator precursor. The temperature of the heat treatment is adjusted according to the components of the mixture. In some embodiments of the present invention, the temperature of the heat treatment ranges from 60° C. to 250° C., such as 80° C., 100° C., 120° C., 150° C., 180° C., 210° C. or 230° C.

The preparation method of the separator of the present invention involves a hydrolysis step, by which the properties of the obtained separator can be improved, such as better ionic conductivity. In some embodiments, the hydrolysis step is performed in the aqueous acid or alkaline solution. More specifically, the hydrolysis step is carried out in the following manner: immersing the dense separator precursor (resin film) in the 4M aqueous sodium hydroxide solution (alkali) at 25° C. to 70° C. for 24 hours, or in the 4M aqueous lithium hydroxide solution for 24 hours, or in the 4M aqueous sulfuric acid solution (acid) for 24 hours; next, washing with deionized water for 3 times; and next, drying at 120° C. for 1 hour to obtain the separator. In a preferred embodiment, the separator precursor is hydrolyzed in pure water.

In a preferred embodiment, the separator is improved by more than 10% in ionic conductivity, compared to the non-hydrolyzed separator (the resin film). In another preferred embodiment, the separator has an elongation at break of greater than 10%.

In the present invention, the thickness of the separator is not particularly limited, may be adjusted according to the actual application, and preferably ranges from 0.1 μm to 100 μm.

In the present invention, the resin film may further comprise a filler, the content of which is greater than 0 part by weight and not more than 60 parts by weight, preferably ranges from 10 parts by weight to 60 parts by weight, and more preferably ranges from 20 parts by weight to 60 parts by weight, based on 100 parts by weight of the resin film.

In the present invention, the composition may further comprise a filler, the content of which is greater than 0 part by weight and not more than 60 parts by weight, preferably ranges from 10 parts by weight to 60 parts by weight, and more preferably ranges from 20 parts by weight to 60 parts by weight, based on 500 parts by weight of the composition.

In the present invention, the filler may be a flame retardant, a hydrophilic material composed of an acidic substance and an alkaline substance, a ceramic oxide, a lithium salt, an organic acid, an ionic liquid or any combinations thereof. The hydrophilic material may be composed of the acidic substance (such as the Lewis acid) and the alkaline substance (the Lewis base). The hydrophilic material includes, but is not limited to, melamine sulfate, melamine hydrochloride, melamine polyphosphate, melamine pyrophosphate, melamine cyanurate, melamine oxalate, metal orthophosphate or any combinations thereof.

The present invention also provides a combination film, which comprises the separator described above.

The present invention further provides a battery, which comprises an anode layer; a cathode layer; and the separator described above and disposed between the anode layer and the cathode layer. The battery comprises a fuel cell, a flow battery, or a lithium battery, but is not limited thereto.

The present invention will be further illustrated with respect to the following examples, but it should be understood that these examples are only used for illustration and should not be construed as a limitation of the implementation of the present invention.

Material source and preparation in the Examples:

Preparation Example 1: Preparation of Polybenzimidazole

A 500 mL four-neck reaction flask was set up, dry nitrogen gas was passed into the reaction flask, and then 2 g of 2,2-bis(4-carboxyphenyl)-hexafluoropropane (purchased from TCI), 6 g of monosodium 2-sulfoterephthalate (purchased from TCI), 6 g of 3,3'-diaminobenzidine (purchased from TCI), 30 g of $P_2O_5$ (purchased from Sigma Aldrich) and 460 g of polyphosphoric acid (purchased from ARCOS) were added in sequence. It was uniformly stirred with a mechanical motor, and the temperature was raised to 200° C. to react for 24 hours. A large amount of deionized water was poured into the resulting reaction solution to precipitate a solid. The solid was alkali-washed with 10 wt % NaOH aqueous solution, then repeatedly washed with a large amount of deionized water until neutral, and dried in an oven at 140° C. for 24 hours to obtain the polybenzimidazole powder.

Preparation Example 2: Preparation of Polybenzoxazole

A 500 mL four-neck reaction flask was set up, dry nitrogen gas was passed into the reaction flask, and then 9.1 g of 2,2-bis(3-amino-4-hydroxyphenyl)hexafluoropropane (purchased from TCI), 9.8 g of 2,2-bis(4-carboxyphenyl)-hexafluoropropane (purchased from TCI), 30 g of $P_2O_5$ (purchased from Sigma Aldrich) and 460 g of polyphosphoric acid (purchased from ARCOS) were added in sequence. It was uniformly stirred with a mechanical motor, and the temperature was raised to 200° C. to react for 24 hours. A large amount of deionized water was poured into the resulting reaction solution to precipitate a solid. The solid was alkali-washed with 10 wt % NaOH aqueous solution, then repeatedly washed with a large amount of deionized water until neutral, and dried in an oven at 140° C. for 24 hours to obtain the polybenzothiazole powder.

Preparation Example 3: Preparation of Polyamide-Imide

A 500 mL four-neck reaction flask was set up, dry nitrogen gas was passed into the reaction flask, and then 24 g of 4,4'-(hexafluoroisopropylidene)diphthalic anhydride (6FDA) (purchased from TCI), 12 g of 4,4'-diamino benzanilide (DABA) (purchased from TCI) and 140 g of N-methylpyrrolidone (purchased from SHINY CHEMICAL INDUSTRIAL CO., LTD.) were added in sequence. It was uniformly stirred with a mechanical motor to react for 24 hours, and the temperature was raised to 180° C. and kept for 4 hours to carry out the thermal ring closing reaction. A large amount of methanol was poured into the resulting reaction solution to precipitate a solid. The solid was washed with methanol, and then dried in an oven at 140° C. for 24 hours to obtain the polyamide-polyimide powder.

Preparation Example 4: Preparation of Polyester Imide

A 500 mL four-neck reaction flask was set up, dry nitrogen gas was passed into the reaction flask, and then 22 g of ethylene glycol bis(trimellitic anhydride) (TMEG) (purchased from TCI), 11 g of 4,4'-oxydianiline (ODA) (purchased from TCI) and 140 g of N-methylpyrrolidone (purchased from SHINY CHEMICAL INDUSTRIAL CO., LTD.) were added in sequence. It was uniformly stirred with a mechanical motor to react for 24 hours, and the temperature was raised to 180° C. and kept for 4 hours to carry out the thermal ring closing reaction. A large amount of methanol was poured into the resulting reaction solution to precipitate a solid. The solid was washed with methanol, and then dried in an oven at 140° C. for 24 hours to obtain the polyester-polyamideimide powder.

Preparation Example 5: Preparation of Polybenzosulfonate-Imide

A 500 mL four-neck reaction flask was set up, dry nitrogen gas was passed into the reaction flask, and then 24 g of 4,4'-(hexafluoroisopropylidene)diphthalic anhydride (6FDA) (purchased from TCI), 19 g of 4,4'-diaminobenzidine-2,2'-disulfonic acid (BDSA) (purchased from TCI) and 140 g of N-methylpyrrolidone (purchased from SHINY CHEMICAL INDUSTRIAL CO., LTD.) were added in sequence. It was uniformly stirred with a mechanical motor to react for 24 hours, and the temperature was raised to 180° C. and kept for 4 hours to carry out the thermal ring closing reaction. A large amount of methanol was poured into the resulting reaction solution to precipitate a solid. The solid was washed with methanol, and then dried in an oven at 140° C. for 24 hours to obtain the hexafluoropolyimide powder.

Preparation Example 6: Preparation of Polybenzoate-Imide

A 500 mL four-neck reaction flask was set up, dry nitrogen gas was passed into the reaction flask, and then 24 g of 4,4'-(hexafluoroisopropylidene)diphthalic anhydride (6FDA) (purchased from TCI), 15 g of 6,6'-bisamino-3,3'-methylidene dibenzoic acid (MBAA) (purchased from TCI) and 140 g of N-methylpyrrolidone (purchased from SHINY CHEMICAL INDUSTRIAL CO., LTD.) were added in sequence. It was uniformly stirred with a mechanical motor to react for 24 hours, and the temperature was raised to 180° C. and kept for 4 hours to carry out the thermal ring closing reaction. A large amount of methanol was poured into the resulting reaction solution to precipitate a solid. The solid was washed with methanol, and then dried in an oven at 140° C. for 24 hours to obtain the transparent polyimide powder.

Preparation of the Filler

Flame retardant: melamine cyanurate (purchased from: Haiwang Chemical)

Lithium salt: HQ-115 (purchased from: 3M)

Ionic liquid: imidazolium 1-hexyl-3-methyltetrafluoromethanesulfonate (purchased from: Sigma Aldrich)

Ceramic oxide: Preparation of lithium lanthanum zirconium oxide $Li_7La_3Zr_2O_{12}$ (LLZO)

In the experiment, $Li_7La_3Zr_2O_{12}$ (LLZO) was prepared by traditional solid-phase method, and the specific steps were as the following. $LiOH \cdot H_2O$ (95%, Alfa), $ZrO_2$ (99%, Alfa) and $La_2O_3$ (99.95%, Alfa) were accurately weighed with the electronic balance according to stoichiometric ratio, in which $LiOH \cdot H_2O$ was weighed in excess of 10% to compensate for the loss of Li element during high-temperature sintering. After the ingredients were prepared, ball milling and discharging were carried out. The prepared raw materials were put into the ball mill tank at one time, and then a certain amount of anhydrous ethanol was added. After the ball mill tank was sealed, it was put into the planetary ball mill to perform ball milling for 12 hours. After the ball milling was completed, the uniformly mixed slurry was poured into a clean mortar, which was then placed under a baking lamp for drying. The dried powder was put into a crucible, which was then put into a high-temperature furnace and let the powder be sintered at 1100° C. for 12 hours to obtain a precursor with a certain crystal structure. After the sintering was completed, the obtained powder was ball-milled for the second time for 12 hours, followed by sieving to obtain the lithium lanthanum zirconium oxide $Li_7La_3Zr_2O_{12}$ (LLZO) powder.

Example 1

7 g (70 parts by weight) of polybenzimidazole, 3 g (30 parts by weight) of polyamide-polyimide, and 40 g (400 parts by weight) of N-methylpyrrolidone were mixed at 120° C. under 1 atm for 2 hours using a mixer to form a colloidal mixture. The colloidal mixture was coated on a glass substrate to form a coating film having a thickness of 200 μm on the glass substrate. The coating film was subject to a heat treatment, which was a drying treatment at 90 to 150° C. for 5 minutes. Afterwards, the temperature was raised to 250° C., and then the aging treatment was performed at this temperature for 1 hour to obtain the separator precursor (i.e. the resin film) with a thickness of 20 μm.

Examples 2 to 7 and Comparative Examples 1 to 4

The separator precursors (i.e., the separators that have not been hydrolyzed) of Examples 2 to 7 and Comparative Examples 1 to 4 were obtained using the same steps as those of Example 1, except that the type and dosage of each component were changed, as shown in Table 1.

Example 8

4 g (40 parts by weight) of polybenzimidazole, 4 g (40 parts by weight) of polyamide-polyimide, 2 g (20 parts by weight) of melamine cyanurate, and 40 g (400 parts by weight) of N-methylpyrrolidone (purchased from SHINY CHEMICAL INDUSTRIAL CO., LTD.) were mixed at 120° C. under 1 atm for 2 hours using a mixer to form a colloidal mixture, which was milled and dispersed three times by three drums. The colloidal mixture was coated on a glass substrate to form a coating film having a thickness of 200 μm on the glass substrate. The coating film was subject to a heat treatment to form a heat-treated coating film, in which the heat treatment was a drying treatment at 150 to 250° C. for 30 minutes to obtain the separator precursor (the resin film) with a thickness of 20 μm.

Examples 9 to 11 and Comparative Examples 5 to 7

The separator precursors (i.e., the separators that have not been hydrolyzed) of Examples 9 to 11 and Comparative Examples 5 to 7 were obtained using the same steps as those of Example 8, except that the type and dosage of each component were changed, as shown in Table 2.

Example 12

4 g (40 parts by weight) of polybenzimidazole, 4 g (40 parts by weight) of polyamide-polyimide, 2 g (20 parts by weight) of lithium salt, and 40 g (400 parts by weight) of N-methylpyrrolidone (purchased from SHINY CHEMICAL INDUSTRIAL CO., LTD.) were mixed at 120° C. under 1 atm for 2 hours using a mixer to form a colloidal mixture. The colloidal mixture was coated on a glass substrate to form a coating film having a thickness of 200 μm on the glass substrate. The coating film was subject to a heat treatment to form a heat-treated coating film, in which the heat treatment was a drying treatment at 150 to 250° C.

under nitrogen atmosphere for 30 minutes to obtain the separator precursor (the resin film) with a thickness of 20 μm.

Examples 13 and Comparative Examples 8 to 9

The separator precursors (i.e., the separators that have not been hydrolyzed) of Example 13 and Comparative Examples 8 to 9 were obtained using the same steps as those of Example 12, except that the type and dosage of each component were changed, as shown in Table 2.

The hydrolysis method for the separator precursors of the above Examples and Comparative Examples was soaking in 4M aqueous sulfuric acid solution at 25° C. for 24 hours, washing with deionized water for 3 times and drying at 120° C. for 1 hour to complete the hydrolysis of the separator.

Evaluation Items

Measurement of porosity (%): The separators of Examples 1 to 13 and Comparative Examples 1 to 9 were measured using a mercury porosimeter (brand: Micromeritics; model: AutoPore® IV 9520).

Measurements of tensile strength (MPa) and elongation at break (%): The separators of Examples 1 to 13 and Comparative Examples 1 to 9 were measured using a tensile testing machine (brand: LLOYD; model: LRX), wherein the pulling speed was 100 mm/min.

Measurement of acid content (%): The separators of Examples 1 to 13 and Comparative Examples 1 to 9 were weighed (W1, in grams) and then immersed in an aqueous sulfuric acid solution (including sulfuric acid and water, and the concentration of sulfuric acid being 3M) with a temperature of 25±3° C. for 7 days. Afterwards, the separators were taken out, wiped off the aqueous sulfuric acid solution adhering to its surface and then weighed (W2, in grams). The acid content (%) was [(W2−W1)/W1]×100%.

Measurement of moisture content (%): The separators of Examples 1 to 13 and Comparative Examples 1 to 9 were weighed (W1, in grams) and then immersed in an aqueous solution with a temperature of 80° C. for 1 day. Afterwards, the separators were taken out, wiped off the aqueous solution adhering to its surface to form a water absorbing separator, and then weighed (W2, in grams). The moisture content (%) was [(W2−W1)/W1]×100%.

Measurement of ionic conductivity (mS/cm): The separators of Examples 1 to 13 and Comparative Examples 1 to 9 were subject to impedance value measurement under 25° C. using the quadrupole column conductivity measuring instrument available from BekkTECH LLC in the United States and the AC impedance analysis method of the impedance analysis equipment Autolab. The ionic conductivity (S/cm) was 1/[(impedance value×separator width×separator thickness)/spacing of reference electrodes], in which the unit of the separator width, the separator thickness, and the spacing of the reference electrodes was cm.

Vanadium ion diffusion rate (%): The aqueous sulfuric acid solution with a concentration of 2.5M was mixed with $VOSO_4$ to form a first mixed solution, in which the concentration of $VOSO_4$ was 1M, and the concentration of sulfuric acid was 2.5M. The aqueous sulfuric acid solution with a concentration of 2.5M was mixed with $MgSO_4$ to form a second mixed solution, in which the concentration of $MgSO_4$ was 1M, and the concentration of sulfuric acid was 2.5M. The environment temperature for experiments was 25±3° C. The separators of Examples 1 to 13 and Comparative Examples 1 to 9 were placed in a container with an accommodating space, which was divided into a first accommodating space portion (left side) and a second accommodating space portion (right side). The first mixed solution and the second mixed solution were respectively introduced into the first accommodating space portion and the second accommodating space portion. The first mixed solution and the second mixed solution were irradiated with light having a wavelength of 766 nm, and the absorbance of the first mixed solution ($A_V$) and the absorbance of the second mixed solution ($A_{Mg}$) were calculated using a UV-Vis Spectrometer, the Fick's Law and the Beer's Law. Afterwards, the vanadium ions began to pass through the separators, and the above steps were repeated at different measurement times (t) to obtain the absorbance of the first mixed solution ($A_V$) and the absorbance of the second mixed solution ($A_{Mg}$) at different measurement times. The values of $In(A_V-2A_{Mg})$ were plotted versus measurement times to obtain a first formula, which was used to calculate the mass transfer coefficient (ks). Next, the mass transfer coefficient was substituted into the second formula to calculate the Vanadium ion diffusion rate (D). The first formula is $In(A_V-2A_{Mg})=InA_V-(2\times ks\times A\times t)/V_A$, and the second formula is $D=ks\times d$, wherein A is the contact area of the separator (in $cm^2$), t is the measurement time, $V_A$ is the volume of the second accommodating space portion (in $cm^3$), and d is the thickness of the separator (in cm).

Gas permeability rate (%): In this test, the oxygen gas permeability test was based on the principle of differential pressure method. The pretreated test piece was placed between the upper and lower test chambers and clamped. First, the low-pressure chamber (the lower chamber) was vacuum-treated, and then the entire system was evacuated. When the specified vacuum degree was reached, the lower test chamber was closed, and the high-pressure chamber (the upper chamber) was filled with a certain pressure of test gas to ensure that a constant pressure difference was formed on both sides of the test piece, so that the gas will infiltrate from the high-pressure side to the low-pressure side under the action of the pressure difference gradient. By monitoring the internal pressure of the low-pressure side, various barrier parameters of the test piece were obtained. A trace oxygen permeation analyzer, product model: 8001, Model 8001 Oxygen Permeation Analyzer, was mainly used to measure the oxygen transmission rate (OTR) of related samples. Under the condition that one side of the separator was evacuated and the other side of the separator was fed with oxygen at room temperature, the amount of oxygen permeating the sample per unit area in unit time was obtained by the trace oxygen permeation analyzer equipment. $Q=K\cdot A\cdot\cdot\Delta p$, where Q is the permeation rate of gas through the separator, K is the permeability coefficient of a certain gas through the separator, A is the area of the separator, and $\Delta p$ is the gas pressure difference on both sides of the separator.

TABLE 1

| Material composition | | Examples 1 | 2 | 3 | 4 | 5 | 6 | 7 | Comparative Examples 1 | 2 | 3 | 4 |
|---|---|---|---|---|---|---|---|---|---|---|---|---|
| Non-hydrolyzable organic polymer (parts by weight) | Polybenzimidazole | 70 | 50 | 30 | 0 | 60 | 60 | 60 | 100 | 0 | 20 | 60 |
| | Polybenzoxazole | 0 | 0 | 0 | 70 | 0 | 0 | 0 | 0 | 100 | 0 | 0 |
| Hydrolyzable organic polymer (parts by weight) | Polyamide-imide | 30 | 50 | 70 | 30 | 0 | 0 | 0 | 0 | 0 | 80 | 0 |
| | Polyester imide | 0 | 0 | 0 | 0 | 40 | 0 | 0 | 0 | 0 | 0 | 0 |
| | Polybenzosulfonate-imide | 0 | 0 | 0 | 0 | 0 | 40 | 0 | 0 | 0 | 0 | 40 |
| | Polybenzoate-imide | 0 | 0 | 0 | 0 | 0 | 0 | 40 | 0 | 0 | 0 | 0 |
| Organic solvent (parts by weight) | N-methylpyrrolidone (parts by weight) | 400 | 400 | 400 | 400 | 400 | 400 | 400 | 400 | 400 | 400 | 400 |
| Hydrolyzed or not | | Yes | Yes | Yes | Yes | Yes | Yes | Yes | Yes | Yes | Yes | No |
| Appearance of separator | | Neat | Neat | Neat | Neat | Neat | Neat | Neat | Neat | Neat | Break | Neat |
| Porosity (%) | | 9 | 17 | 24 | 8 | 16 | 15 | 14 | 2 | 7 | — | 6 |
| Tensile strength (MPa) | | 58 | 49 | 48 | 47 | 50 | 52 | 53 | 130 | 110 | — | 98 |
| Elongation at break (%) | | 74 | 45 | 17 | 16 | 49 | 61 | 65 | 5 | 9 | — | 8 |
| Acid content (%) | | 12 | 18 | 22 | 12 | 10 | 15 | 14 | 35 | 0.1 | — | 0.1 |
| Moisture content (%) | | 12 | 16 | 20 | 10 | 10 | 15 | 14 | 0.1 | 0.1 | — | 0.1 |
| Ionic conductivity (mS/cm) | | 2 | 3 | 4 | 2 | 3 | 3 | 3 | 0 | 0 | — | 0 |
| Vanadium ion diffusion rate ($\times 10^{-8}$ $cm^2$/min) | | 15 | 18 | 46 | 15 | 16 | 25 | 24 | 460 | 0 | — | 0 |
| Gas permeability rate (cc/$m^2$*day) | | 57 | 50 | 71 | 59 | 52 | 49 | 56 | 159 | 103 | — | 59 |

TABLE 2

| Material composition | | | Examples 8 | 9 | 10 | 11 | 12 | 13 | Comparative Examples 5 | 6 | 7 | 8 | 9 |
|---|---|---|---|---|---|---|---|---|---|---|---|---|---|
| Non-hydrolyzable organic polymer (parts by weight) | | Polybenzimidazole | 40 | 35 | 30 | 40 | 40 | 40 | 20 | 40 | 40 | 40 | 40 |
| | | Polybenzoxazole | 0 | 0 | 0 | 0 | 0 | 0 | 0 | 0 | 0 | 0 | 0 |
| Hydrolyzable organic polymer (parts by weight) | | Polyamide-imide | 0 | 0 | 0 | 0 | 0 | 0 | 10 | 0 | 0 | 0 | 0 |
| | | Polyester imide | 0 | 0 | 0 | 0 | 0 | 0 | 0 | 0 | 0 | 0 | 0 |
| | | Polybenzosulfonate-imide | 40 | 25 | 10 | 40 | 40 | 40 | 0 | 40 | 40 | 40 | 40 |
| | | Polybenzoate-imide | 0 | 0 | 0 | 0 | 0 | 0 | 0 | 0 | 0 | 0 | 0 |
| Filler (parts by weight) | Flame retardent | melamine cyanurate | 20 | 40 | 60 | 0 | 0 | 0 | 70 | 20 | 0 | 0 | 0 |
| | Ceramic oxide | lithium lanthanum zirconium oxide | 0 | 0 | 0 | 20 | 0 | 0 | 0 | 0 | 20 | 0 | 0 |
| | acidic and alkaline hydrophilic material | Lithium salt | 0 | 0 | 0 | 0 | 20 | 0 | 0 | 0 | 0 | 20 | 0 |
| | Ionic liquid | imidazolium 1-hexyl-3-methyltetrafluoro methanesulfonate | 0 | 0 | 0 | 0 | 0 | 20 | 0 | 0 | 0 | 0 | 20 |
| Organic solvent | | N-methylpyrrolidone (parts by weight) | 400 | 400 | 400 | 400 | 400 | 400 | 400 | 400 | 400 | 400 | 400 |
| Hydrolyzed or not | | | Yes | Yes | Yes | Yes | Yes | Yes | Yes | No | No | No | No |
| Appearance of separator | | | Normal | Normal | Normal | Normal | Normal | Normal | Break | Normal | Normal | Normal | Normal |
| Porosity (%) | | | 21 | 45 | 59 | 20 | 19 | 26 | — | 6 | 5 | 10 | 15 |
| Tensile strength (MPa) | | | 48 | 39 | 28 | 51 | 52 | 47 | — | 53 | 56 | 50 | 45 |
| Elongation at break (%) | | | 35 | 25 | 10 | 39 | 45 | 40 | — | 8 | 9 | 6 | 8 |
| Acid content (%) | | | 22 | 42 | 52 | 18 | 19 | 21 | — | 1 | 1 | 3 | 5 |
| Moisture content (%) | | | 21 | 40 | 50 | 17 | 21 | 20 | — | 1 | 1 | 3 | 5 |
| Ionic conductivity (mS/cm) | | | 3 | 4 | 4 | 3 | 3 | 3 | — | 0 | 0 | 0 | 0 |
| Vanadium ion diffusion rate ($\times 10^{-8}$ $cm^2$/min) | | | 36 | 100 | 165 | 12 | 52 | 55 | | 0 | 0 | 0 | 0 |
| Gas permeability rate ($\times 10^{-8}$ $cm^2$/min) | | | 88 | 92 | 125 | 76 | 71 | 79 | — | 78 | 101 | 150 | 215 |

Figure 2:
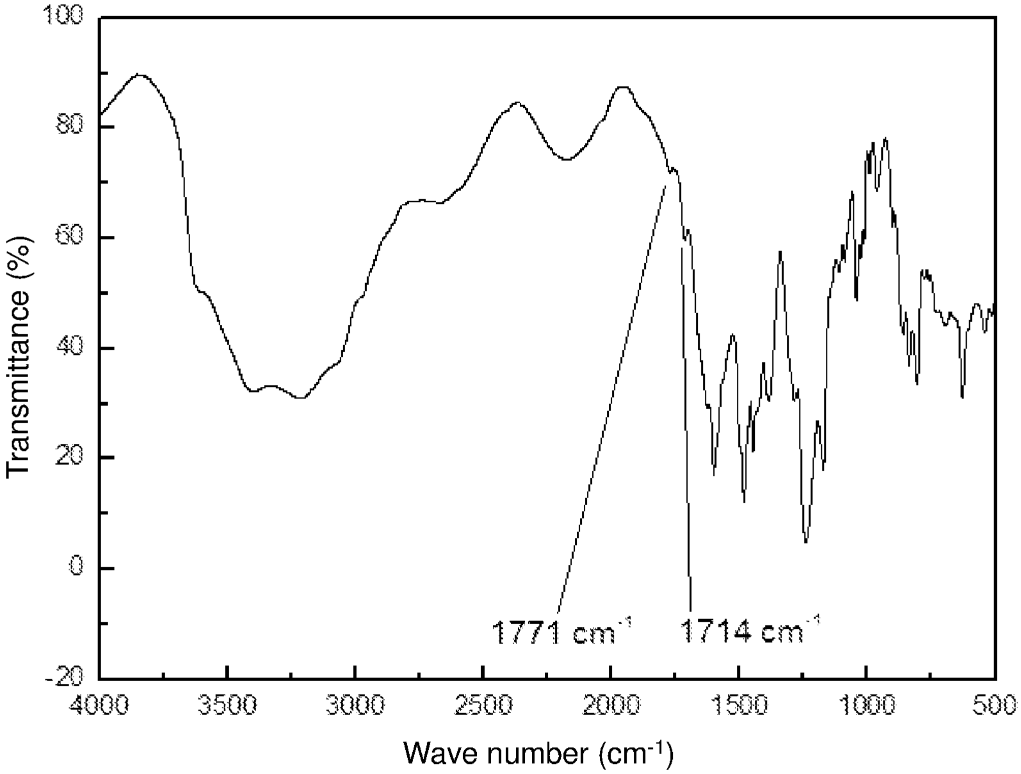
FIG. 2 shows the FTIR spectrum of the separator (after hydrolysis) according to Example 1 of the present invention.

Please refer to FIG. 1, which shows the FTIR spectrum of the separator in Example 1 before hydrolysis. It can be observed from the FTIR spectrum that there are two characteristic peaks at wavelengths 1777 $cm^{-1}$ and 1722 $cm^{-1}$, which are the C═O bond absorption peaks of symmetric imide and asymmetric amide, respectively. Please refer to FIG. 2, which shows the FTIR spectrum of the separator in Example 1 after hydrolysis. After hydrolysis by acid treatment, two characteristic peaks at wavelengths 1771 $cm^{-1}$ and 1714 $cm^{-1}$ in the FTIR spectrum were obviously reduced, indicating that the content of amide-imide bonds was reduced, and the separator had been hydrolyzed.

Figure 3:
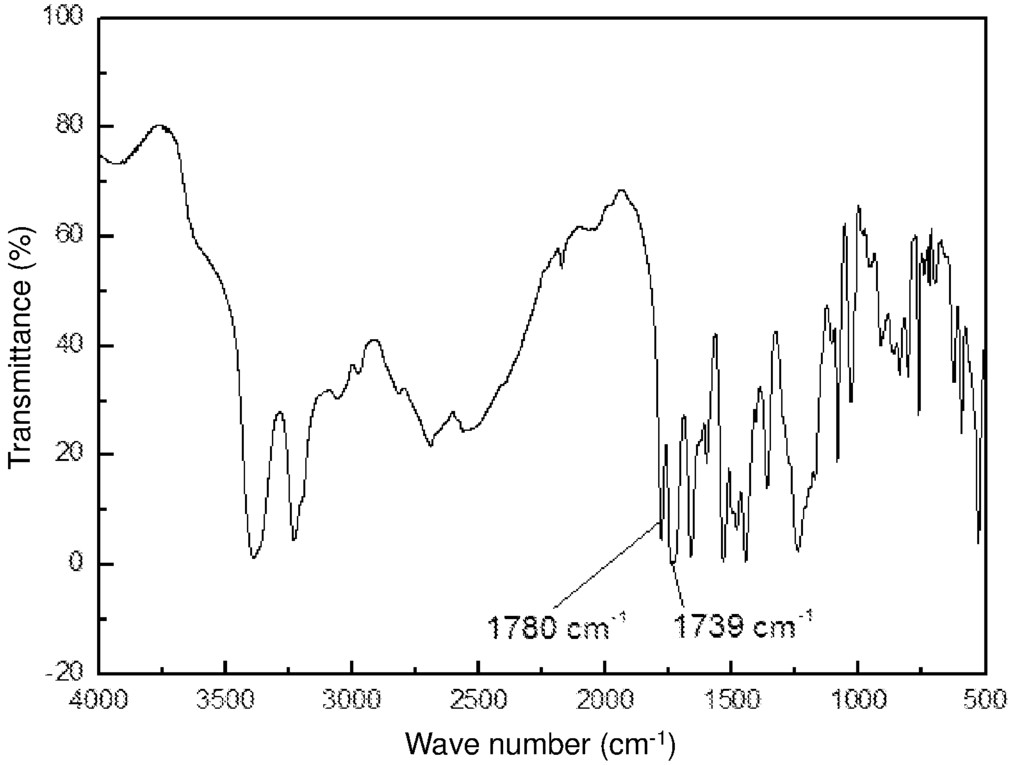
FIG. 3 shows the FTIR spectrum of the separator before hydrolysis according to Example 9 of the present invention.
Figure 4:
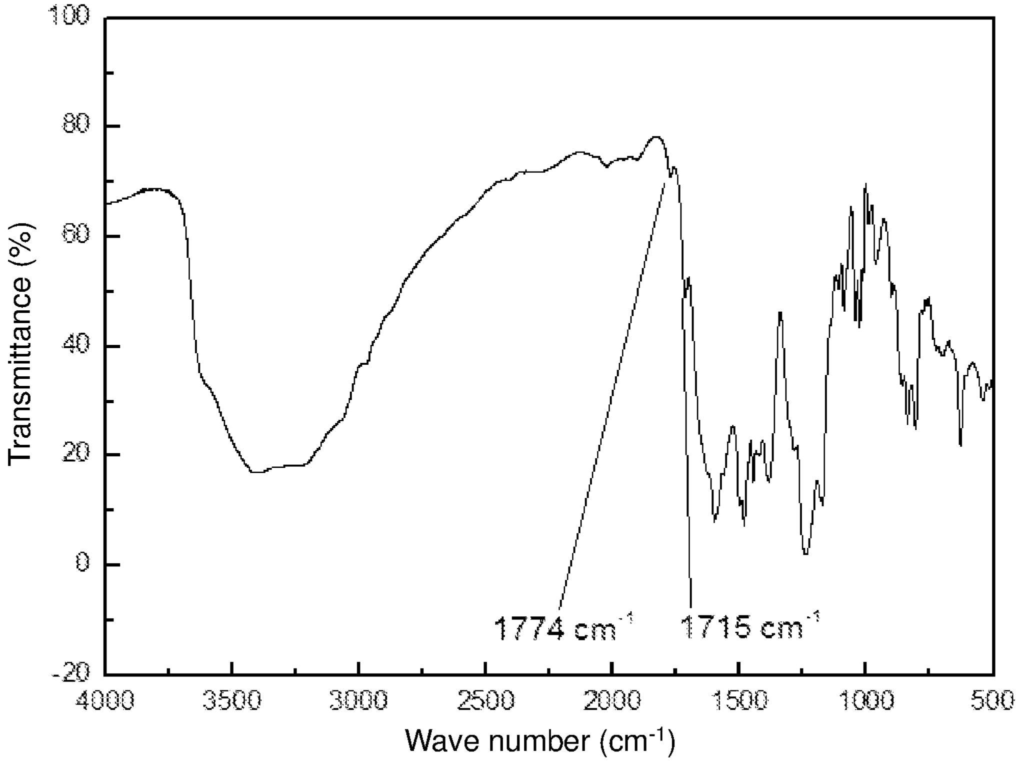
FIG. 4 shows the FTIR spectrum of the separator (after hydrolysis) according to Example 9 of the present invention.

FIG. 3 shows the FTIR spectrum of the separator in Example 9 before hydrolysis. It can be observed from FIG. 3 that there are two characteristic peaks at wavelengths 1780 $cm^{-1}$ and 1739 $cm^{-1}$, which are the C═O bond absorption peaks of symmetric imide and asymmetric amide, respectively. FIG. 4 shows the FTIR spectrum of the separator in Example 9 after hydrolysis. After hydrolysis by acid treatment, two characteristic peaks at wavelengths 1774 $cm^{-1}$ and 1715 $cm^{-1}$ in the FTIR spectrum were obviously reduced, indicating that the content of amide-imide bonds was reduced, and the separator had been hydrolyzed.

Referring to Tables 1 and 2, the separators of Examples 1 and 7 have high ionic conductivity, high elongation at break, low vanadium ion diffusion rate, and low gas permeation rate after soaking in 4M sulfuric acid solution hydrolysis treatment. The vanadium ion in the electrolyte of the vanadium redox flow battery or the fuel gas in the fuel cell can be effectively prevented from passing, and the safety and life of the battery can be effectively improved, so the purpose of the present invention can be achieved. The separators of Examples 8 and 13 additionally contain the filler, and they also have high ionic conductivity after being hydrolyzed by soaking in 4M sulfuric acid solution, but the vanadium ion diffusion rate and gas permeation rate are slightly higher than those of the separators of Examples 1 and 7.

Referring to Table 1 and Table 2, the separators of Comparative Examples 1 and 2 only used the organic polymer component with a non-hydrolyzable structure, and their ionic conductivity cannot be measured after being soaked in 4M sulfuric acid solution at room temperature for hydrolysis treatment. The separator of Comparative Example 3 contained 80% by weight of the organic polymer with a hydrolyzable structure. After being hydrolyzed by 4M sulfuric acid solution at room temperature, the separator was broken and could not be used, and could not be formed into a film for detection. As to the separator of Comparative Example 5, it contained 70% by weight of the filler. After being hydrolyzed by 4M sulfuric acid solution at room temperature, the separator was broken and cannot be used. The separators of Comparative Example 4 and Comparative Examples 6 to 9 were not subject to hydrolysis treatment of soaking in 4M sulfuric acid solution at room temperature, and their ionic conductivity could not be measured.

Although the separators of Comparative Example 4 and Comparative Examples 6 to 9 used the components of the non-hydrolyzable organic polymer and the hydrolyzable organic polymer of the present invention, they were not soaked in 4M sulfuric acid solution for hydrolysis such that the ionic conductivity of these separators could not be measured and these separators cannot be used in batteries. On the other hand, the separators of Examples 1 to 7 of the present invention included the components of the non-hydrolyzable organic polymer and the hydrolyzable organic polymer of the present invention. After being hydrolyzed by soaking in a 4M sulfuric acid solution at room temperature, the hydrophilicity of the separator was improved to have excellent ionic conductivity such that the separator has beneficial applications in flow batteries, fuel cells or lithium batteries.

Application Examples 1 and 2

Production and Testing of Flow Battery:

Measurement of coulombic efficiencies (%), voltage efficiencies (%), and energy efficiencies (%) of flow batteries: The separators of Examples 2 and 3, graphite felt electrode, bipolar plate, and 100 ml of electrolyte were assembled using polyvinyl chloride plates and frames to constitute a single battery with an effective area of 5 cm×5 cm. The electrolyte was prepared from 456 grams of $VOSO_4$ powder and 1000 milliliters of aqueous sulfuric acid solution, in which the sulfuric acid concentration of the aqueous sulfuric acid solution was 3M. The single battery was charged and discharged using a battery charge-discharge tester [brand: Chroma; model: Model 17011] and measured for the power, and then the coulombic efficiency, energy efficiency, and voltage efficiency were calculated based on the power, in which the current density was 100 $mA/cm^2$, the cut-off voltage ranged from 0.7V to 1.6V, and the flow rate was 50 mL/min. The electrical test results are listed in Table 3, as shown for Application Examples 1 and 2.

TABLE 3

| Electrical properties of flow battery | | Application Example 1 | Application Example 2 |
|---|---|---|---|
| 100 $mA/cm^2$ | Coulombic efficiency (%) | 100 | 98 |
| | Voltage efficiency (%) | 88 | 89 |
| | Energy efficiency (%) | 88 | 87 |
| 150 $mA/cm^2$ | Coulombic efficiency (%) | 100 | 99 |
| | Voltage efficiency (%) | 84 | 83 |
| | Energy efficiency (%) | 84 | 82 |
| 200 $mA/cm^2$ | Coulombic efficiency (%) | 100 | 99 |
| | Voltage efficiency (%) | 78 | 78 |
| | Energy efficiency (%) | 78 | 77 |
| 250 $mA/cm^2$ | Coulombic efficiency (%) | 100 | 99 |
| | Voltage efficiency (%) | 73 | 73 |
| | Energy efficiency (%) | 73 | 71 |

Referring to Table 1, Table 2, and Table 3, the separators of Examples 2 and 3 have higher coulombic efficiency and lower vanadium ion diffusion rate, which can prevent the vanadium ions of the flow battery from inter-diffusion in the separator. As shown by the test results of Application Examples 1 and 2 in Table 3, when being applied to the flow battery, the separator containing the hydrolyzable organic polymer has excellent electrical properties after hydrolysis.

Application Examples 3 and 4

Preparation of Membrane Electrode Assemblies for Fuel Cells:

The separator precursors (the resin film) of Example 2 and Example 13 were soaked in 4M sulfuric acid solution for hydrolysis treatment and then immersed in 10M phosphoric acid at 60° C. for 1 hour to obtain a phosphorylated separator with an area of 6×6 $cm^2$. The gas diffusion electrode in the membrane electrode element used carbon papers of 5×5 $cm^2$ as the cathode gas diffusion layer and the anode gas diffusion layer, and its thickness was 280 microns. Next, the electrode catalyst layer in the gas diffusion electrode was formed by coating the cathode gas diffusion layer and the anode gas diffusion layer with commercially available Pt/C catalyst slurry and drying at 160° C. An electrode catalyst layer was formed on the cathode gas diffusion layer and the anode gas diffusion layer respectively. The cathode gas diffusion layer with the electrode catalyst layer was the cathode gas diffusion electrode here, and the anode gas diffusion layer with the electrode catalyst layer was the anode gas diffusion electrode here, wherein the total Pt content was about 1 $mg/cm^2$. Next, the electrode catalyst layer of the cathode gas diffusion electrode and the electrode catalyst layer of the anode gas diffusion electrode were respectively placed on both sides of the aforementioned phosphorylated separator (phosphorylated PBI electrolyte membrane), and then a hot pressing process was performed to form the membrane electrode element, wherein the temperature of the hot pressing process was, for example, 130° C. to 160° C., and the pressure was, for example, 20 MPa to 30 MPa. The electrical test results of the fuel cells are shown for Application Examples 3 and 4 in Table 4, respectively.

Electric power density test of the fuel cell: First, the prepared cell was activated, and the activation steps were as follows: (1) Under the open circuit voltage (OCV) state, the anode end was fed with hydrogen at 200 c.c./min, the cathode end was fed with air at 500 c.c./min, and the cell was heated to 120° C. (2) When the cell temperature reached 120° C., a certain current of 200 $mA/cm^2$ was loaded, and the cell temperature was raised continuously to 180° C. (3) When the cell temperature reached 180° C., the reactant gas flow rate was changed to an equivalent ratio of 1.2 (hydrogen) to 2 (air). (4) The operation was continued for 24 hours to 72 hours until the cell voltage reached a stable state. After the cell was activated, under the operating conditions of the temperature between 100° C. and 180° C., hydrogen and air (dose ratio of about 1:2) were introduced. Under this condition, the current density and electric power value of the cell at 0.6V were measured.

TABLE 4

| Electrical properties of fuel cell | | Application Example 3 | Application Example 4 |
|---|---|---|---|
| 0.6 V current density ($mA/cm^2$) | 100° C. | 144 | 104 |
| | 120° C. | 216 | 192 |
| | 140° C. | 236 | 268 |
| | 160° C. | 289 | 300 |
| | 180° C. | 392 | 368 |
| Maximum electrical power ($mW/cm^2$) | 100° C. | 151 | 130 |
| | 120° C. | 224 | 197 |
| | 140° C. | 330 | 316 |
| | 160° C. | 422 | 406 |
| | 180° C. | 516 | 492 |

Referring to Table 1, Table 2, and Table 4, the separators of Example 2 and Example 13 are hydrolyzed, so they have high ionic conductivity and low gas permeation rate, which can effectively prevent the fuel gas of the fuel cell from inter-diffusion in the separator. As shown by the electrical test results of application examples 3 and 4 for fuel cells respectively, the hydrolyzed separator of Application example 3 had a higher current density when applied to fuel cells.

Application Examples 5 and 6

Preparation of Lithium Battery:

A solid polymer electrolyte (SPE) was prepared by mixing PEO (MW=300,000, Sigma Aldrich) with LiTFSI (HQ-115, 3M) (PEO:LiTFSi=10:1) and acetonitrile (anhydrous, Sigma Aldrich) using a high-speed mixer. $LiFePO_4$ (LFP) powder (purchased from MTI), PEO/LiTFSI, and carbon black (w:w:w=60:25:15) were mixed with acetonitrile using a high-speed mixer. The LFP active material loading was 1.5 $mg/cm^2$. The slurry was then cast on aluminum foil with a doctor blade. The electrodes were then dried in a 60° C. vacuum oven for at least 48 hours. The separator precursors of Example 3 and Example 11 were hydrolyzed by soaking in 4M sulfuric acid solution, then soaking in 4M LiOH aqueous solution (Sigma Aldrich) for 24 hours, washing with deionized water three times, and vacuum-baking at 200° C. for 1 hour. Afterwards, the lithium foil/SPE/separator/SPE/LFP was pressed into a button battery (lithium foil, Sigma Aldrich). The electrical test results of the lithium batteries are shown for Application Examples 5 and 6 in Table 5. The single cell was tested at 60° C. by the battery charge and discharge tester [brand: Chroma; model: Model 17011], in which the single cell was charged and discharged at different rates C/10, C/5, C/2, 1C and measured for 10 cycle average power.

TABLE 5

| Electrical properties of lithium battery | | Application Example 5 | Application Example 6 |
|---|---|---|---|
| Charging efficiency | | >99% | >99% |
| Specific capacity (mAh/g) | 60° C., C/10 | 151 | 162 |
| | 60° C., C/5 | 131 | 149 |
| | 60° C., C/2 | 113 | 125 |
| | 60° C., 1C | 100 | 116 |

Referring to Table 1, Table 2, and Table 5, the separator precursors of Example 3 and Example 11 were made into batteries after being soaked in 4M lithium hydroxide aqueous solution (alkaline) and hydrolyzed. The prepared batteries were applied to the lithium batteries. As shown by the electrical test results of Application Example 5 and 6 respectively, the lithium batteries can both be charged and discharged.

To sum up, the present invention makes the separator have high ionic conductivity, high elongation at break, low vanadium ion diffusivity, and low gas permeability through the non-hydrolyzable polymer, hydrolyzable polymer, and the dosage design, which can not only effectively prevent the passage of vanadium ions in the electrolyte, but also reduce the permeability of vanadium ions. In the application to flow batteries, high coulomb efficiency is produced, and in the application to fuel cells and lithium batteries, better electrical properties are obtained, and the battery safety and life are effectively improved. Therefore, the separator of the present invention can be used in all-vanadium flow batteries, fuel cells or lithium batteries.

Those described above are only preferred embodiments of the present invention, and should not be used to limit the scope of the present invention, which means that all simple and equivalent change and modification made according to the content of the claims and specification of the present invention still fall within the patent scope of the present invention.

What is claimed is:

1. A separator formed by hydrolysis of a resin film, wherein the resin film comprises:

a non-hydrolyzable organic polymer comprising polybenzimidazole, polybenzoxazole, polybenzothiazole, polyetherketone, polyphenylene ether, polyethersulfone, polysulfone, polyphenylene sulfide, polypropylene, polyethylene, polystyrene or a combination thereof; and a hydrolyzable organic polymer being hydrolyzable with treatment of at least one of an aqueous acid solution, an aqueous alkaline solution and pure water, wherein a content of the hydrolyzable organic polymer ranges from 10 parts by weight to 70 parts by weight, based on 100 parts by weight of the resin film, and the hydrolyzable organic polymer includes a repeating unit represented by formula (1):

(1)

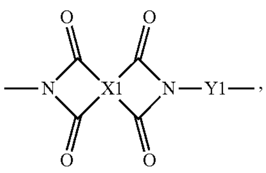

wherein X1 is a tetravalent group comprising at least one aromatic or alicyclic group; Y1 is a divalent group comprising at least one aromatic or alicyclic group, and at least one of X1 and Y1 comprises at least one functional group structure among an ester bond, an amide bond, a sulfonic acid group, a phosphoric acid group, a carboxylic acid group, a hydroxyl group and a nitro group.

2. The separator of claim 1, wherein the non-hydrolyzable organic polymer has a hydrophilic functional group in the side chain.

3. The separator of claim 2, wherein the hydrophilic functional group comprises a sulfonic acid group, a phosphoric acid group, a carboxylic acid group, an amide group or a hydroxyl group.

4. The separator of claim 1, wherein X1 is selected from the tetravalent groups represented by formula (2), formula (3), formula (4), formula (5), or formula (6):

(2)

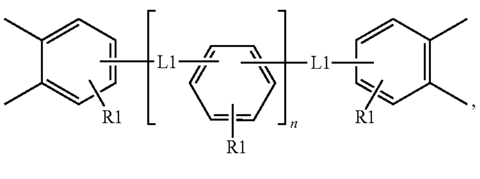

-continued (3)

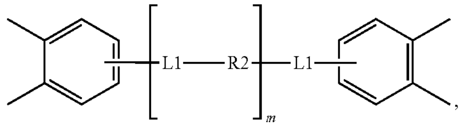

(4)

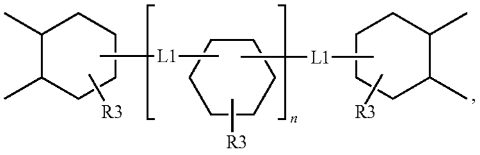

(5)

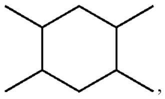

(6)

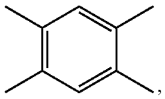

wherein R1 independently represents —H, —F, $—CF_3$, $—SO_3H$, $—PO_3H_2$, —COOH, —OH, a linear or branched chain alkyl with 1 to 6 carbon atoms or phenyl; R2 independently represents a linear or branched chain hydrocarbon group with 2 to 36 carbon atoms or a cyclic hydrocarbon group with 3 to 20 carbon atoms; R3 independently represents —H, —F, $—CF_3$, $—SO_3H$, $—PO_3H_2$, —COOH, —OH, a linear or branched chain hydrocarbon group with 1 to 6 carbon atoms; L1 independently represents —O—, —S—, $—SO_2—$, a single bond, —NH—, —C(═O)—, —CH═CH—, —C≡C—, $—CH_2—$, $—(CH_2)_2—$, $—C(CH_3)_2—$, $—C(CF_3)_2—$, —C(═O)O—, —OC(═O)—, —C(═O)NH— or —NHC(═O)—; n independently represents an integer from 0 to 5; and m represents an integer from 1 to 5.

5. The separator of claim 1, wherein Y1 is the divalent group represented by formula (7), formula (8), or formula (9):

(7)

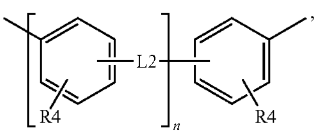

(8)

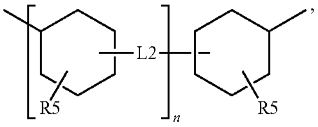

(9)

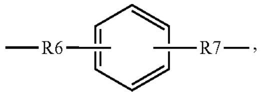

wherein L2 independently represents —O—, —S—, $—SO_2—$, a single bond, —NH—, —C(═O)—, —CH═CH—, —C≡C—, $—CH_2—$, $—(CH_2)_2—$, $—C(CH_3)_2—$, $—C(CF_3)_2—$, —C(═O)O—, —OC (=O)—, —C(=O) NH— or —NHC(=O)—; R4 independently represents —H, —F, —$CF_3$, —$SO_3H$, —$PO_3H_2$, —COOH, —OH, a linear or branched chain hydrocarbon group with 1 to 6 carbon atoms or phenyl; R5 independently represents —H, —F, —$CF_3$, —$SO_3H$, —$PO_3H_2$, —COOH, —OH, a linear or branched chain hydrocarbon group with 1 to 6 carbon atoms or phenyl; R6 and R7 independently represent a linear or branched chain hydrocarbon group with 1 to 9 carbon atoms; and n represents an integer from 0 to 5.

6. The separator of claim 1, wherein the separator has an elongation at break of greater than 10%.

7. The separator of claim 1, wherein the separator has a thickness of 0.1 μm to 100 μm.

8. The separator of claim 1, wherein the resin film further comprises a filler, the content of which is greater than 0 part by weight and not more than 60 parts by weight, based on 100 parts by weight of the resin film.

9. The separator of claim 8, wherein the filler is selected from a flame retardant, a hydrophilic material composed of an acidic substance and an alkaline substance, a ceramic oxide, a lithium salt, an organic acid, an ionic liquid or a combination thereof.

10. The separator of claim 1, wherein the resin film is formed from a composition comprising the non-hydrolyzable organic polymer, the hydrolyzable organic polymer, and an organic solvent.

11. A combination film comprising the separator of claim 1.

12. A battery comprising:

an anode layer;

a cathode layer; and the separator of claim 1 disposed between the anode layer and the cathode layer.

13. The battery of claim 12 comprising a fuel cell, a flow battery, or a lithium battery.

* * * * *